(12) United States Patent
Patterson et al.

(10) Patent No.: US 10,784,657 B2
(45) Date of Patent: Sep. 22, 2020

(54) ELECTRICAL SUBSTATION SAFETY BARRIER DEVICE AND METHOD

(71) Applicant: Puget Sound Energy, Inc., Bellevue, WA (US)

(72) Inventors: Jeffrey Michael Patterson, Lake Tapps, WA (US); Joshua David Lewis, Buckley, WA (US); Kurt Patrick Heinz, Puyallup, WA (US)

(73) Assignee: PUGET SOUND ENERGY, INC., Bellevue, WA (US)

( * ) Notice: Subject to any disclaimer, the term of this patent is extended or adjusted under 35 U.S.C. 154(b) by 126 days.

(21) Appl. No.: 15/910,849

(22) Filed: Mar. 2, 2018

(65) Prior Publication Data

US 2019/0140428 A1    May 9, 2019

Related U.S. Application Data

(60) Provisional application No. 62/581,204, filed on Nov. 3, 2017.

(51) Int. Cl.

| | | |
|---|---|---|
| *H01B 17/00* | (2006.01) | |
| *H02B 1/14* | (2006.01) | |
| *F16G 11/14* | (2006.01) | |
| *H02B 1/52* | (2006.01) | |
| *H02B 3/00* | (2006.01) | |
| *H02B 5/00* | (2006.01) | |

(52) U.S. Cl.
CPC ............. *H02B 1/14* (2013.01); *F16G 11/143* (2013.01); *H02B 1/52* (2013.01); *H02B 3/00* (2013.01); *H02B 5/00* (2013.01)

(58) Field of Classification Search
CPC ... H02B 1/14; H02B 3/00; H02B 5/00; H02B 1/26; H02B 1/30; H02B 1/00; F16G 11/143; F16G 11/14; H01B 17/00; H01B 17/005
USPC ......... 174/5 R, 5 SB, 135, 158 F, 50, 137 R, 174/138 R; 361/600, 601, 602, 627, 641, 361/679.01
See application file for complete search history.

(56) References Cited

U.S. PATENT DOCUMENTS

| | | | | |
|---|---|---|---|---|
| 5,682,015 A * | 10/1997 | Harben | ................. | H01B 17/00 174/138 R |
| 6,269,000 B1 * | 7/2001 | McCarrol | ............. | H02B 1/202 361/695 |
| 7,405,923 B2 * | 7/2008 | Kelly | ....................... | H02B 1/14 361/644 |
| 7,834,269 B2 * | 11/2010 | Niles | ....................... | H02G 7/00 174/84 R |
| 10,236,093 B2 * | 3/2019 | Ferraiuolo, Jr. | ....... | H01B 17/56 |
| 10,236,665 B2 * | 3/2019 | Groner | .................... | H02B 1/42 |

* cited by examiner

*Primary Examiner* — Angel R Estrada
(74) *Attorney, Agent, or Firm* — Fountainhead Law Group P.C.

(57) ABSTRACT

A safety device is configured to be attached to components in an electrical substation to provide a physical and visual barrier between de-energized components and energized components in the electrical substation. The safety may include a safety barrier board formed from an electrically insulating material and configured to be attached to fastening devices that attach the safety barrier board to components in the substation. Each fastening device may be an inverted-J-hook configured to be attached to a surface of the safety barrier board or a coupling link attached to a variable length fastening component and an attachment hook.

18 Claims, 6 Drawing Sheets

ELECTRICAL SUBSTATION SAFETY BARRIER DEVICE AND METHOD

BACKGROUND

Technical Field

The present application is directed generally to safety systems for electrical substations, and more specifically to a safety device and method for replacing high voltage circuit breakers in an electrical substation.

Description of the Related Art

Electrical power is generated in central locations at power stations and then transmitted and distributed over large distances from the power stations to industrial and residential end users. Electrical power transmission uses alternating voltages and currents (i.e. AC) due to the ease with which such AC power can be generated and provided to end users. For efficiency reasons, the voltages at which electrical power is transmitted in AC distribution systems are necessarily very high. Overhead power transmission cables typically transfer electrical power at hundreds of kilovolts (kV), with subsequent distribution occurring at lower voltages. Electrical power generated at power stations is transferred over main power transmission lines to substations. These substations typically convert the very high voltages present on the transmission lines to intermediate voltages and then provide these intermediate voltages to a distribution network that provides this power to users in a specific area, such as industrial facility like a factory or residential neighborhoods including housing, apartment, and commercial units.

To perform the desired function of voltage reduction and distribution, substations typically include a variety of components including transformers, circuit breakers, and high-power switches. A substation typically includes redundant or duplicate components to ensure that electrical power is not lost in the event of failure of one component. For example, substations typically include two transformers provided in parallel, each being connected to the transmission and distribution network through associated switches and circuit breakers. In this way, one transformer can be completely isolated from other components in the substation and repaired or replaced while allowing electrical power to continue to be provided over the distribution network to end users through the other transformer.

In a substation, the repair and replacement of components such as transformers and circuit breakers is very dangerous for maintenance personnel performing these repairs or replacement. This is due to the high voltages and currents (i.e., the high power) present on such components as well as the proximity of components in a substation. As mentioned above, one circuit including a transformer and circuit breaker, for example, is "energized" or active to supply electrical power while another redundant circuit is being repaired or replaced. In a typical substation, components are placed relatively close together to reduce the overall size of the substation, and thus maintenance personnel are working on a de-energized or inactive circuit proximate an adjacent circuit carrying very high, typically kilovolt level, voltages. Parallel circuits in a substation are commonly located within arm's length reach of one another such that maintenance personnel working on one circuit could accidentally touch the adjacent energized circuit simply by reaching out his or her arm. This is obviously a very dangerous situation for the maintenance personal and there is accordingly a need for providing improved safety for such maintenance personnel in these situations.

BRIEF SUMMARY

In one embodiment, a safety device is configured to be attached to components in electrical substation to provide a physical barrier between de-energized components in the electrical substation and energized components in the electrical substation. The safety device may include a safety barrier board formed from an insulating material and may further include fastening devices for attaching the safety barrier board to components in the substation. Each fastening device may be an inverted-J-hook configured to be attached to a surface of the safety barrier board or a coupling link attached to a variable length fastening component and an attachment hook.

BRIEF DESCRIPTION OF THE SEVERAL VIEWS OF THE DRAWINGS

The foregoing and other features and advantages will become apparent from the following detailed description of embodiments of the present disclosure, given by way of illustration and not limitation with reference to the accompanying drawings, in which.

DETAILED DESCRIPTION

Figure 1:
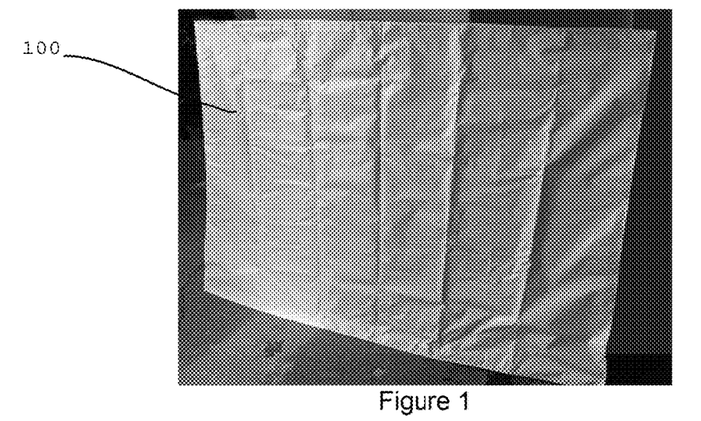
FIG. 1 is a perspective view illustrating a protective bag that includes a safety barrier board and other components of substation safety barrier kit according to one embodiment of the present disclosure.
Figure 2:
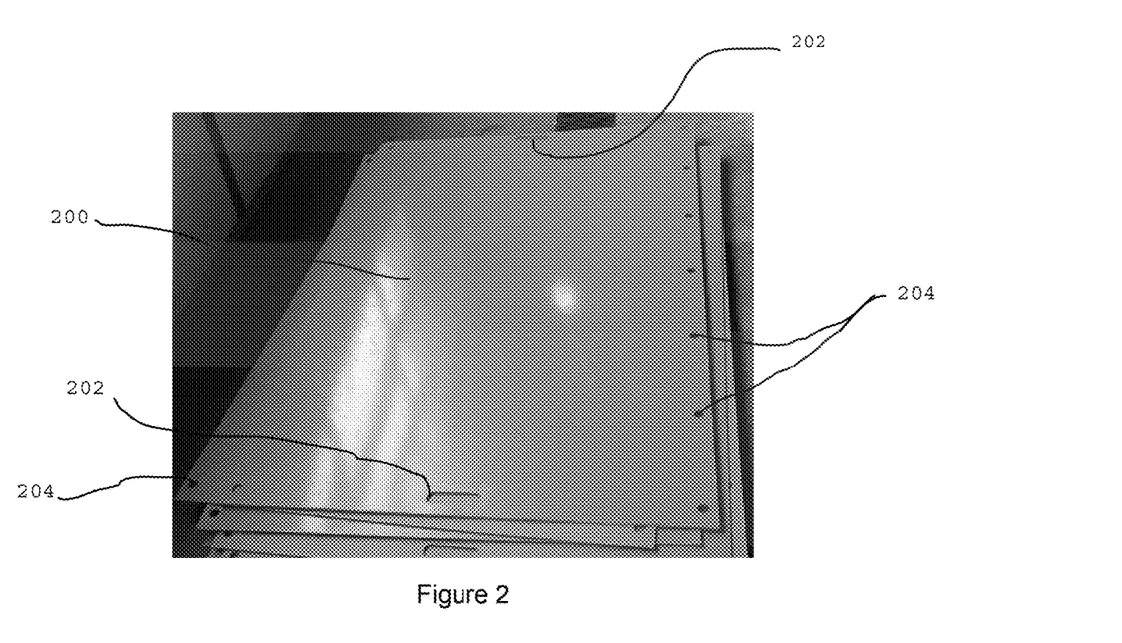
FIG. 2 is a perspective view illustrating one embodiment of the safety barrier board contained in the substation safety barrier kit of FIG. 1.

FIG. 1 illustrates a protective bag 100 for holding a substation safety barrier kit (not shown) for use in electrical substations according to one embodiment of the present disclosure. The substation safety barrier kit includes a safety barrier board 200 as shown in FIG. 2 that is configured to be positioned between adjacent electrical circuit components in a substation where one of the adjacent components is being repaired or replaced by maintenance personnel, as will be described in more detail below. The safety barrier board 200 is made of a suitable electrically insulating material that provides desired electrical isolation and also presents a visual and physical barrier from the high voltages present on nearby components in an electrical substation. The safety barrier board 200 in the embodiment of FIG. 2 is rectangular shaped and accordingly has four sides or edges, and the board includes cutouts 202 proximate two edges of the board that are intended to function as gripping handles for maintenance personnel when placing the board in a desired position within the substation. The cutouts 202 also assist maintenance personnel in removing and transporting the safety barrier board 200. In the embodiment of FIG. 2, the safety barrier board 200 also includes a plurality of attachment holes 204 formed in the board along one edge of the board and also at least one hole proximate each corner of the board. The holes 204 allow for various types of fastening devices to be attached to the safety barrier board 200 to position the board as desired within a variety of different substations, many of which may have a unique layout of components, as will be described in more detail below.

The safety barrier board 200 may be placed in the protective bag 100, along with other components of the safety barrier kit for securing the board in a desired position within a substation. The bag 100 stores the safety barrier board 200 and these associated components, which will be described in more detail below. The bag 100 storing the safety barrier kit including the safety barrier board 200 may then be placed in a maintenance vehicle and utilized to transport the safety barrier kit to and from substations in which the safety barrier board is utilized. The safety barrier kit includes all components required for maintenance personnel deploy the safety barrier board 200 in a substation during repair or replacement of a substation component. In the embodiment of FIG. 2, the safety barrier board 200 is rectangular shaped, but the board may be square or have other shapes in alternative embodiments of the present disclosure. In addition, the holes 204 are round in the embodiment of FIG. 2, but may have different shapes in other embodiments of the present disclosure.

In the present description, certain details are set forth in conjunction with the described embodiments to provide a sufficient understanding of the present disclosure. One skilled in the art will appreciate, however, that embodiments of the disclosure may be practiced without these particular details. Furthermore, one skilled in the art will appreciate that the present disclosure is not limited to the example embodiments described herein, and will also understand that various modifications, equivalents, and combinations of the disclosed embodiments and components of such embodiments are within the scope of the present disclosure. Embodiments including fewer than all the components of any of the respective described embodiments may also be within the scope of the present disclosure although not expressly described in detail below. The operation of well-known components and/or processes has not been shown or described in detail below to avoid unnecessarily obscuring the present disclosure. Finally, components that are common among the described embodiments are given the same reference numbers or descriptors in the present application even though the detailed operation of such components may vary among embodiments.

Unless the context requires otherwise, throughout the specification and claims which follow, the word "comprise" and variations thereof, such as, "comprises" and "comprising" are to be construed in an open, inclusive sense, namely as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It also should be noted that the term "or" is generally employed in its sense including "and/or" unless the content clearly dictates otherwise.

The headings and Abstract of the Disclosure provided herein are for convenience only and do not define the scope or meaning of the embodiments of the present disclosure.

Figure 3:
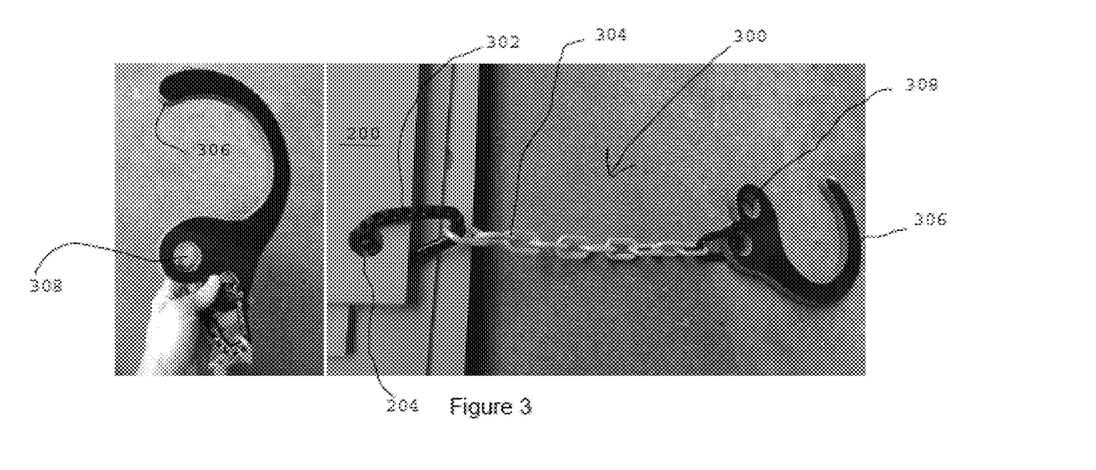
FIG. 3 illustrates fastening devices contained in the substation safety barrier kit of FIG. 1 and attached to the safety barrier board of FIG. 2 for positioning the safety barrier board within a substation.

FIG. 3 illustrates a fastening device 300 contained in the substation safety barrier kit of FIG. 1 attached to the safety barrier board 200 of FIG. 2 for positioning the safety barrier board within a substation. The fastening device 300 is part of the safety barrier kit and enables maintenance personnel to deploy the safety barrier board 200 in a desired location within a substation. In the embodiment of FIG. 3, the fastening device 300 includes a coupling link 302, which is a carabiner in this embodiment, positioned in one of the holes 204 in the safety barrier board 200 to secure the coupling link to the board. A variable length fastening component 304, which is a chain in this embodiment, is attached at one end to the coupling link 302 and at the other end to an attachment device 306. The variable length fastening component 304 can be adjusted to a desired length, by attaching a different link to the coupling link 302 in this embodiment. Each of the coupling link 302, variable length fastening component 304, and attachment device 306 is made of a suitable electrically insulating material, such as plastic, in one embodiment of the present disclosure.

The attachment device 306, which is a hook in the embodiment of FIG. 3, functions to physically couple the safety barrier board 200 to a desired component in the electrical substation. The length of the variable length fastening device 304 is adjusted so that when the attachment hook 306 is attached to the desired component of the substation, the safety barrier board 200 is secured in a desired position between the component in the substation that is being repaired or replaced and an adjacent energized component in the substation. The attachment hook 306 further includes a positioning hole 308 that is adapted to receive a positioning tool (not shown) that can be utilized for coupling the attachment hook to a desired component in the substation, as will be described in more detail below.

Figure 4:
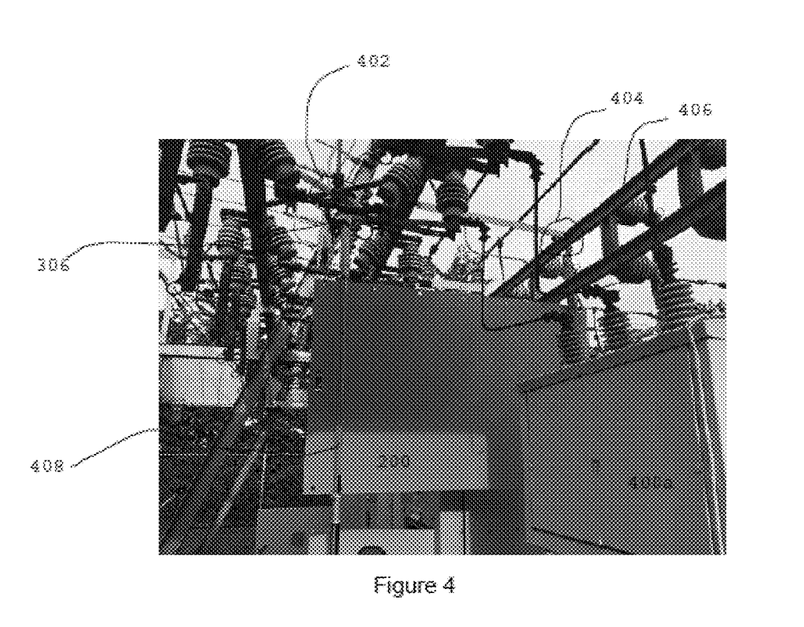
FIG. 4 is a perspective view illustrating a first side view of the safety barrier board of FIG. 2 secured through the chain and fastening devices of FIG. 3 in a desired position between adjacent electrical circuit components of a substation.
Figure 5:
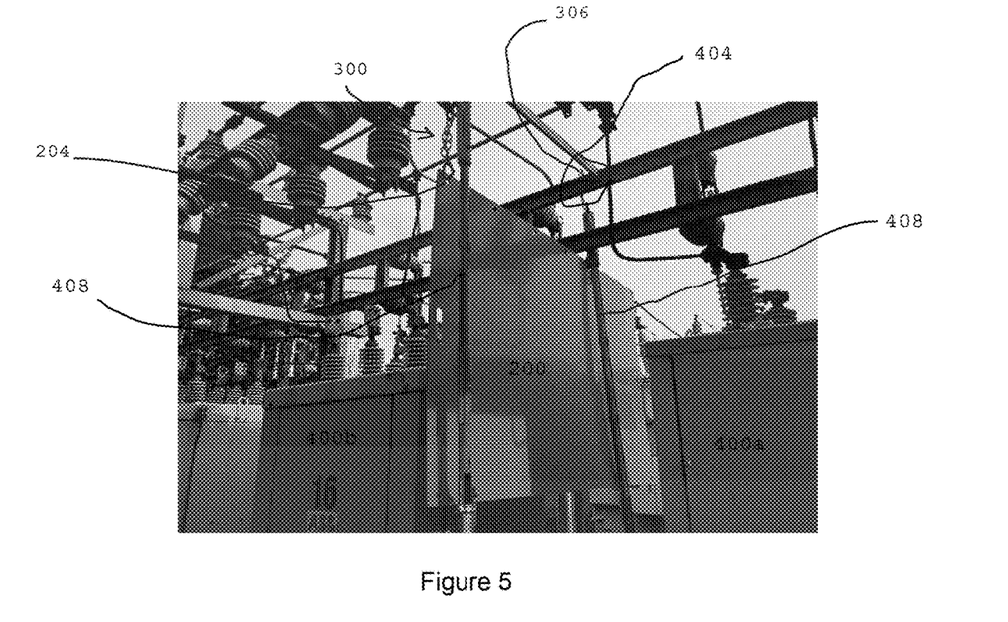
FIG. 5 is a perspective view illustrating the safety barrier board of FIG. 4 from a different perspective better showing the positioning of the board between the adjacent circuit components of the substation.
Figure 6:
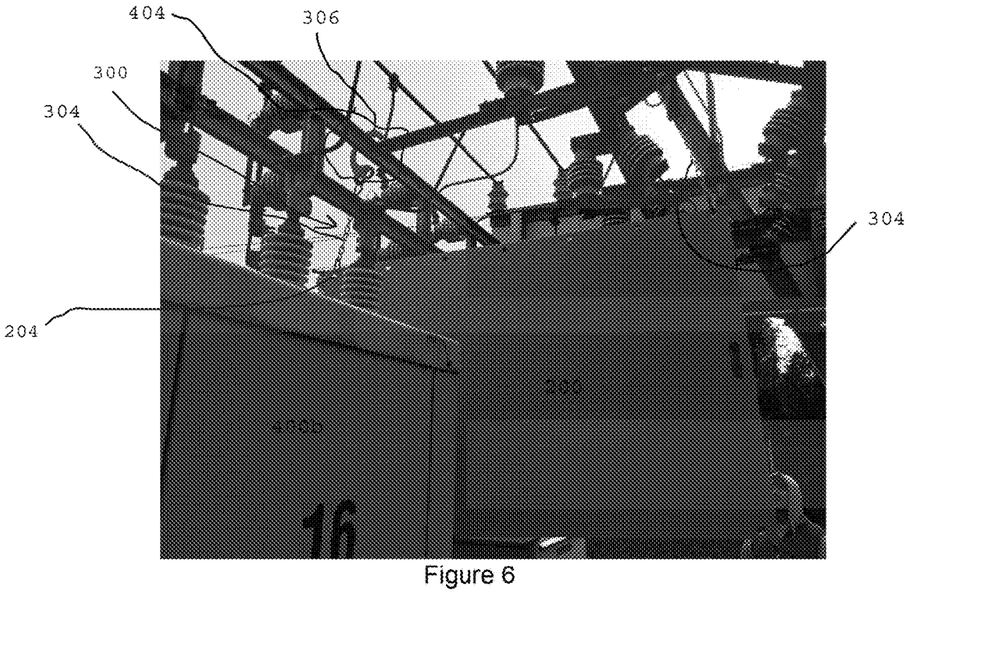
FIG. 6 is a perspective view illustrating a second side view of the safety barrier board opposite the side view of FIG. 4.

In another embodiment, the fastening device 300 has a fixed length. Thus, in the embodiment of FIG. 3 instead of the variable length fastening device 304 coupled between the coupling link 302 and attachment hook 306, a fixed length fastening device 304' (not shown in FIG. 3) is coupled between the coupling link and attachment hook. In this embodiment, the safety barrier kit would include a plurality of pairs of fixed length fastening devices 300, each pair having a different length. In one embodiment, the fixed length fastening device 304' is a chain having a corresponding length, and thus each pair of the plurality of fixed length fastening devices has chains of a different length than the chains of the other pairs. Maintenance personnel would then select from among the plurality of pairs fastening devices 300 the ones having the desired length to properly position the safety barrier board 200. FIG. 4 illustrates a first side view of the safety barrier board 200 of FIG. 2 secured through variable length fastening devices 300 of FIG. 3 in a desired position between adjacent electrical circuit components of a substation. The fastening devices 300 are not clearly seen in FIG. 4 but are better illustrated and discussed in more detail below with references to FIGS. 5 and 6, which illustrate the safety barrier board 200 of FIG. 3 from different perspective views. The electrical components between which the safety barrier board 200 is positioned are assumed to be circuit breakers 400a, 400b in the example of FIG. 4, with only the circuit breaker 400a being seen in FIG. 4. The safety barrier board 200 may of course be used in relation to any high voltage component in the substation, such as manual or automated electrical switches. FIG. 5 better illustrates a first one of the two fastening devices 300 attached through the hole 204 at the frontward top edge of the safety barrier board 200. FIG. 6 better illustrates the second one of the two fastening devices 300 attached through the hole 204 at the rearward top edge of the safety barrier board 200. Additional fastening devices 300 could of course be used to secure the safety barrier board 200 in the desired position. Accordingly, the safety barrier kit (FIGS. 1-3) could include more than two fastening devices 300.

The attachment hooks 306 of these fastening devices 300, which are seen in FIGS. 4 and 6, are then attached to suitable structure or components of the substation as illustrated in the encircled areas 402 and 404 of FIG. 4 to thereby position the safety barrier board 200 in the desired position between the circuit breakers 400a, 400b. In this example, a horizontal beam 406 that is part of the structure of the substation is utilized for attachment of the attachment hook 306 of the associated one of the fastening device 300 in the area 404. Two fastening devices 300 are utilized to support and position the safety barrier board 200 in the example of FIG. 4 and typically two such fastening devices will be sufficient. Additional fastening devices 300 may of course be utilized as previously mentioned.

Also illustrated in FIG. 4 is a suitable positioning tool 408 positioned in the hole 308 of each of the attachment hooks 306. In operation, an individual positioning tool 408 is inserted in the positioning hole 308 (FIG. 3) of each attachment hook 306 and then one or more maintenance personnel (not shown) utilize the tools to lift the attachment hooks up to the desired areas 402, 404 of the substation and attach these hooks to the desired components of the substation in these areas. In the example of FIG. 4, only one of the tools 408 that are utilized is shown and this tool is typically referred to as a "clamp stick" that includes at a first end a clamp that can be inserted in the hole 308 of the attachment hook 306 and activated to secure the hook to the clamp stick. The clamp stick tool 408 includes at a second end opposite the first end a trigger mechanism that activates and deactivates the clamp at the first end. Thus, using the clamp stick tools 408 the fastening devices 300 are attached in areas 402 and 404 and, once attached, the trigger mechanism of the clamp stick tool 408 can be used to deactivate the clamp and the clamp removed from the attachment hook 306. The clamp sticks 408 need not be removed, however, as seen in FIG. 4, where the clamp stick is not removed from the frontward attachment hook 306 but is left hanging from the hook for use in removing the safety barrier board 200 once the maintenance being performed on the circuit breakers 400a, 400b has been completed.

Types of positioning tools 408 other than clamp sticks may of course be utilized to position the safety barrier board 200. Any suitable tool 408 for in attaching the attachment hooks 306 to the desired areas 402, 404 on components of the substation to properly position the safety barrier board 200 may be utilized. In other instances, one positioning tool 408 may be used, with maintenance personnel, for example, using a ladder or other means to attach the fastening devices 300 to the desired areas 402, 404. Furthermore, although positioning of the safety barrier board 200 in Figure has been described as being done by two maintenance personnel two tools 408 to together position the attachment hooks 306 of the respective fastening devices 300 the areas 402, 404, a single maintenance personnel using a single tool may position one hook at time in these areas in at least some instances.

FIG. 5 illustrates the safety barrier board 200 of FIG. 4 from a different perspective better showing the positioning of the board between the adjacent circuit breakers 400a, 400b, one of which is the circuit component of the substation that is being repaired or replaced. In FIG. 5, both the attachment tools 408 secured to the two attachment hooks 306 are also seen, with only the rearward attachment hook 306 seen in FIG. 5. Each of the tools 408 is left secured to the corresponding attachment hook 306 after attaching the hook to the desired components of the substation in the areas 402, 404. The tools 408 can be left hanging as shown in FIG. 5 or removed and then reinserted, as previously discussed.

As better seen in FIG. 5, the safety barrier board 200 physically and visually isolates the circuit breakers 400a, 400b. As a result, maintenance personnel working on circuit breaker 400a, for example, are much less likely to inadvertently or accidentally touch the other circuit breaker 400b while performing the required repair or replacement of circuit breaker 400a. The circuit breaker 400b remains energized in this situation and thus carries very high voltage and current electrical signals that are very dangerous, capable of killing or seriously injuring the maintenance personnel.

As seen in FIG. 5, the circuit breakers 400a, 400b are relatively close to one another. Thus, without the use of the safety barrier board 200, a maintenance person working on the circuit breaker 400a could inadvertently reach his or her hand out, or lose his or her balance and reach out his or her hand, and touch an energized portion of the circuit breaker 400b, potentially resulting in death or serious injury of the maintenance person. The safety barrier board 200 presents a physical barrier to prevent such contact with the active circuit breaker 400b in the example scenario being discussed. Thus, if a maintenance person positioned on the circuit breaker 400s side of the safety barrier board 200 inadvertently reaches out his or her hand, or loses his or her balances, and would otherwise contact the energized circuit breaker 400b, the safety barrier board prevents direct contact between the personnel and the energized breaker. The safety barrier board 200, which is made from a suitable insulating material, is positioned between the maintenance person and the energized circuit breaker 400b and thus even if the person pushes the board into and contact with the energized breaker, the board provides electrical isolation for the person to prevent harm.

In addition, the safety barrier board 200 presents a visual barrier or visual notification to maintenance personnel of a danger being present on the other side of the board. The safety barrier board 200 may be a bright color, such as a bright orange or yellow, to make the board easily visually noticeable by maintenance personnel when doing a repair or replacement in a substation. Due to the proximity of components in substations, such as the circuit breakers 400a, 400b in the example of FIGS. 4-6, a maintenance person could simply not be thinking about or momentarily forget about the danger of the proximate energized component. The safety barrier board 200 presents a visual barrier or visual cue or reminder to maintenance personnel that a danger is present on the other side of the safety barrier board.

FIG. 6 illustrates a second side view of the safety barrier board 200 opposite the side view of FIG. 4. This figure better illustrates the rearward attachment hook 306 and the chain 304 of the rearward fastening device 300 attached to the structure of the substation in the area 404.

Figure 7:
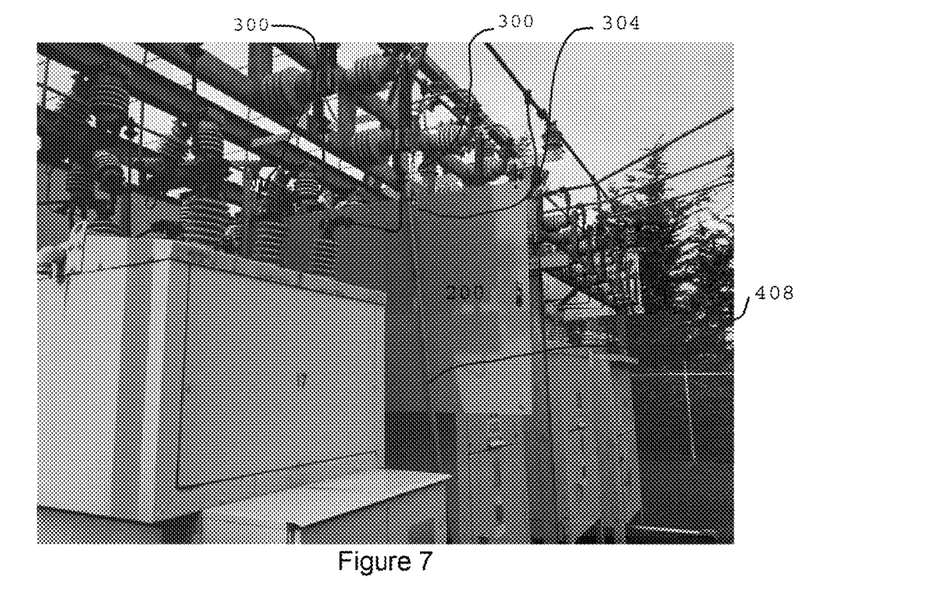
FIG. 7 is a perspective view illustrating another example of the safety barrier board of FIG. 2 secured through the chain and fastening devices of FIG. 3 in a desired position between adjacent circuit components in a substation.

FIG. 7 illustrates another example of the safety barrier board 200 of FIG. 2 secured through the fastening devices 300 of FIG. 3 in a desired position between adjacent circuit components in a substation. This example illustrates the flexibility available to maintenance personnel in placing the safety barrier board in a desired position. The rightmost fastening device 300 in this example is secured to the board 200 not near the front or rightmost edge of the board, but instead is attached through a hole 204 (FIG. 2) that is closer to the center of the board. In this way, the rightmost fastening device 300 is more easily secured to the desired components of the substation above this rightmost fastening device.

Figure 8:
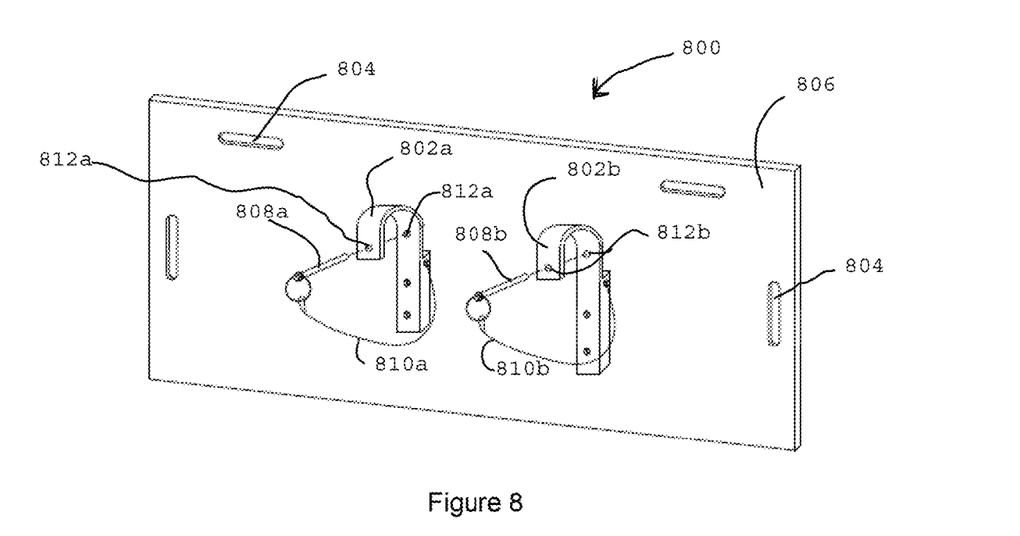
FIG. 8 is a perspective view of a safety barrier board including inverted-J-hooks for attaching the safety barrier board to a side break switch (not shown) according to another embodiment of the present disclosure.

FIG. 8 is a perspective view of a safety barrier board 800 including a fastening device in the form of a pair of inverted-J-hooks 802a, 802b for attaching the safety barrier board to a side break switch (not shown) according to another embodiment of the present disclosure. Once again, the safety barrier board 800 is formed from a suitable insulting material that provides desired electrical isolation and also presents a physical and visual barrier from the high voltages present on proximate components in an electrical substation. The safety barrier board 800 includes a number of cutouts 804 proximate three edges of the board, which are intended to function as gripping handles for maintenance personnel when attaching the board to a side break switch in a substation, as will be described in more detail below. The cutouts 804 also assist maintenance personnel in removing and transporting the safety barrier board 800.

The inverted-J-hooks 802a, 802b are attached to a surface 806 of the safety barrier board 800 through any suitable attachment device, such as screws and bolts, adhesive, and so on. The inverted-J-hooks 802a, 802b further include locking pins 808a, 808b that are attached to the inverted-J-hooks through cable lanyards or cords 810a, 810b, respectively. The locking pins 808a, 808b are configured to be inserted through holes 812a, 812b in the inverted-J-hooks 802a, 802b, respectively, to secure the inverted-J-hooks to a switch blade of a side-break switch (not shown in FIG. 8), as will be described in more detail below. In one embodiment, the inverted-J-hooks are made of an insulating material, such as a suitable plastic.

Figure 9A:
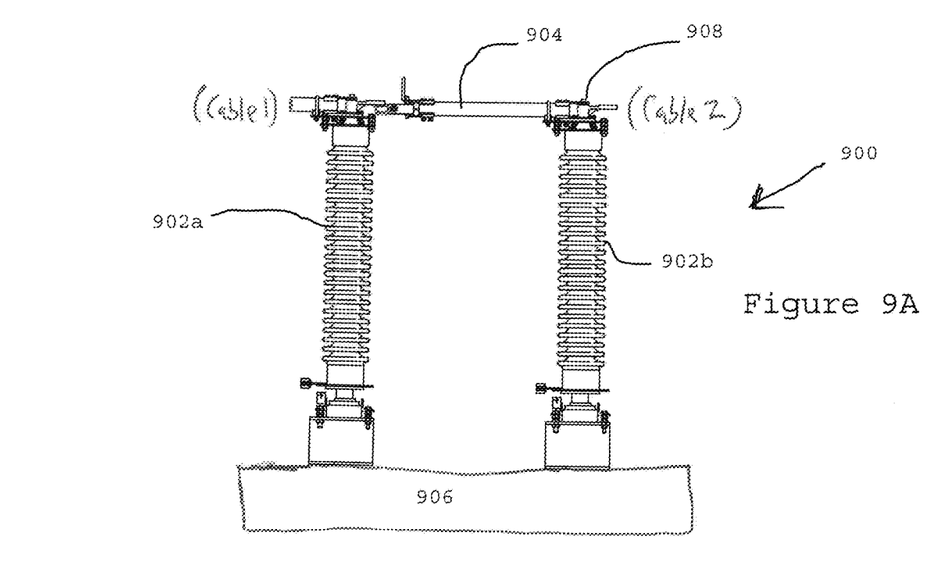
FIGS. 9A-9F illustrate attachment of the safety barrier board of FIG. 8 to a side break switch.

FIGS. 9A-9F illustrate attachment of the safety barrier board 800 of FIG. 8 to a side-break switch 900. The side break switch 900 is shown alone in side view in FIG. 9A and in top view in FIG. 9B. Referring to FIG. 9A, the side break switch 900 includes two vertical members 902a, 902b that support a horizontal switch blade 904 at upper ends of the vertical members. The lower ends of the vertical members 902a, 902b are attached to a suitable base 906 in the substation containing the side-break switch 900. The base 906 would typically be a concrete slab or other material forming a floor of other horizontal attachment structure in the substation. The side-break switch 900 of FIG. 9A is shown in the closed position, namely where a wire or cable indicated as Cable 1 is connected through the switch blade 904, which is formed from a suitable conductive material, to a second wire or cable indicated as Cable 2. The side-break switch 900 rotates the switch blade 904 about a rotational axis 908 to open the switch, as will now be described in more detail below with reference to FIG. 9B.

Figure 9B:
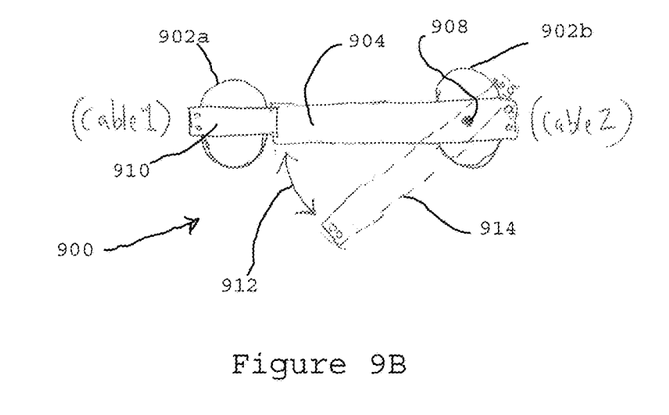

FIG. 9B is top view of the side-break switch 900 of FIG. 9A and includes a conductive plate 910 is shown on top of the vertical member 902a. The cable Cable 1 would be connected to this conductive plate 910, with holes on the left end of the conductive plate representing where the cable Cable 1 would be physically attached to the conductive plate through screws and bolts or other suitable devices. In this way, when the side-break switch 900 is closed, the conductive switch blade 904 is in contact with the conductive plate 910. The cable Cable 1 is accordingly electrically connected through the conductive plate 910 and through the switch blade 904 to the cable Cable 2. The cable Cable 2 would be physically attached to the right end of the switch blade 904 in FIG. 9B, with holes on the far right end of the switch blade representing where the cable Cable 2 would be physically attached to the switch blade through screws and bolts or other suitable devices.

To open the side-break switch 900, the switch blade 904 is rotated about the rotational axis 908 to remove or break the connection between the leftmost end of the switch blade and the conductive plate 910. In this way, the conductive plate 910 is isolated from the conductive switch blade 904 to thereby isolate the cable Cable 1 from the cable Cable 2. The side-break switch 900 includes a suitable control mechanism (not shown in FIGS. 9A and 9B) to rotate the switch blade 904 about the axis rotational 908. This control mechanism may be automated or manual. As the switch blade 904 is rotated about the rotational axis 908, the leftmost end of the switch blade in contact with the conductive plate 910 rotates downward in an arc as indicated by the arrow 912. The switch blade 904 is rotated downward to an open position 914 where the switch blade is represented through a dashed line in FIG. 9B. To close the side-break switch 900, and thereby connect cables Cable 1, Cable 2, the control mechanism once again rotates the switch blade 904 upward along the arc 912 until the switch blade again contacts the conductive plate 910.

Figures 9C, 9D, 9E, 9F:
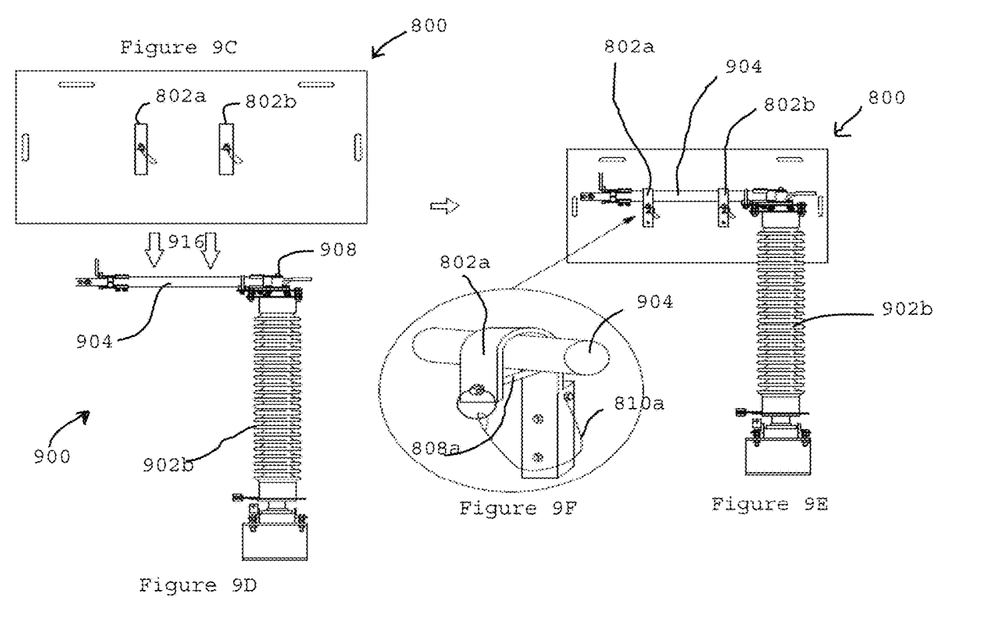
Figure 10:
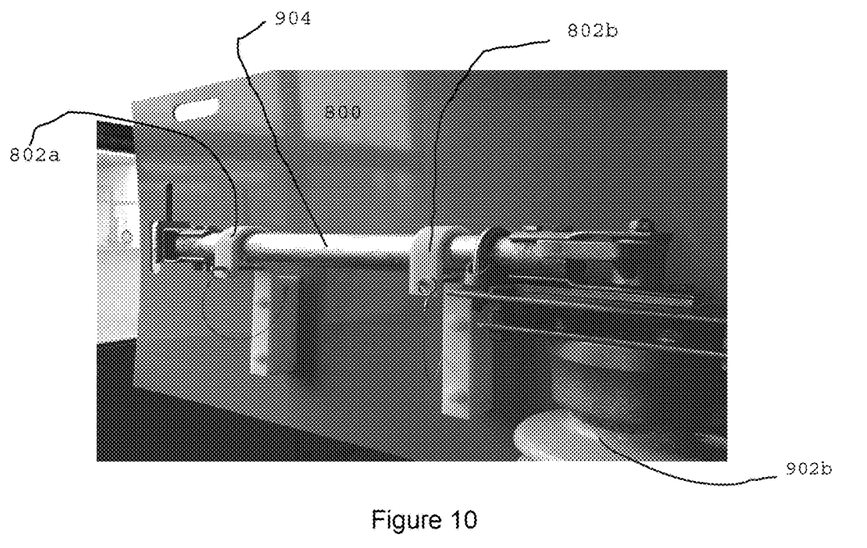
FIG. 10 is perspective view showing the safety barrier board of FIG. 8 attached to a side break switch.

The utilization of the safety barrier board 800 of FIG. 8 in situations involving side-break switches like the switch 900 of FIGS. 9A and 9B will now be described in more detail with reference to FIGS. 8 and 9C-9F. Referring to FIGS. 9C and 9D, the side-break switch 900 is shown in the open position in FIG. 9D. When in this position, the pins 808a, 808b in the inverted-J-hooks 802a, 802b are removed and the safety barrier board 800 lowered downward onto the switch blade 904 as indicated by the arrows 916 in FIG. 9D. The safety barrier board 800 is lowered onto the switch blade 904 until the upper curved portions of the inverted-J-hooks 802a, 802b (see FIG. 8) engage with the switch blade. Once the inverted-J-hooks 802a, 802b engage the switch blade 904, the pins 808a, 808b are inserted into the holes 812a, 812b to attach the safety barrier board 800 to the switch blade of the side-break switch 900 as seen in FIGS. 9E and 9F. FIG. 9E illustrates the safety barrier board 800 attached to the switch blade 904 of the side-break switch 900 while FIG. 9F is an exploded view showing the switch blade 904 inserted in the inverted-J-hook 802a with the pin 808a inserted to attach the safety barrier board to the switch blade. FIG. 10 is a perspective view showing the safety barrier board 800 of FIG. 8 attached to the switch blade 904 of the side-break switch 900.

Once the safety barrier board 800 is attached to the switch blade 904 of the open side-break switch 900, the associated repairs or maintenance being performed by maintenance personnel may be performed with the safety barrier board functioning to prevent these personnel from accidentally or inadvertently contacting proximate components in the substation that are still energized. As previously mentioned, energized components are commonly located very close to the de-energized component being repaired or replaced and therefore present a very dangerous situation for maintenance personnel. After opening the side-break switch 900 (FIG. 9B), one side of the switch would typically still remain energized. For example, in FIG. 8 assume Cable 1 is a cable bringing power into the substation and thus left side of the side-break switch 900, which is coupled to the cable Cable 1, remains energized even when the switch has been opened as in FIG. 9B. The dimensions of a typical side-break switch 900 are such that the energized and de-energized sides of the switch are relatively close one another. For example if maintenance personal is repairing attachment of cable Cable 2 while the cable Cable 1 and conductive plate 910 remain energized, the maintenance personnel is in danger of accidentally or inadvertently touching the conductive plate 910 while performing the repair in the absence of the safety barrier board 800 being placed on the switch blade 904. The safety barrier board 800 provides both a physical barrier and a visual barrier to reduce the likelihood of maintenance personnel making accidental or inadvertent contact with the energized side of the side-break switch 900.

In another embodiment of the safety barrier board 800, the fastening device is formed from a pair of L-shaped hooks configured to secure the board to the switch blade 904 of the side-break switch 900. In still other embodiments, the board 800 includes alternative devices to attach the board 800 to the switch blade 904. In further embodiments, the fastening device is configured to attach the board 800 to different type break substation electrical switches, such as vertical break switches.

In one embodiment, the embodiment of the safety barrier board 200 of FIGS. 1-3 is contained in a first kit that may be utilized by maintenance personnel in substation environments as illustrated and previously discussed with reference to FIGS. 4-7. This first kit is contained in the protective bag 100 and includes all the required components for utilizing the safety barrier board 200 in this type of substation environment, namely the safety barrier board itself plus suitable fastening devices 300 for placing the board in a desired position in the substation environment. The first kit could of course include additional elements, such as suitable tools 408 for use in positioning the safety barrier board 200.

In another embodiment, a second kit for use by maintenance personnel includes all required components for the safety barrier board 800 of FIGS. 8-10 for utilization in substation environments including side-break switches 900 as described above with reference to these figures. With the second kit, maintenance personnel would need to merely attach the inverted-J-hooks 802a, 802b to the safety barrier board 800 prior to utilizing the safety device.

Alternative embodiments of various components described above are within the scope of the present disclosure according to alternative embodiments of the disclosure. For example, the fastening devices 802a, 802b of FIG. 8 may take a suitable form other than inverted-J-hooks for attaching to the safety barrier board 800 and the switch blade 904. The board 800 may in certain applications be attached to different types of substation switches through suitable fastening devices. Regarding the safety barrier board 200, the fastening devices 300 may also be formed from other suitable components. In addition, note that in general the components of the safety barrier boards 200 and 800 are formed from suitable insulating materials to provide isolation for maintenance personnel when utilizing the safety barrier boards. Not all components of the safety barrier boards 200 and 800 must, however, be made from insulating materials. For example, the pins 808a, 808b may be metal pins and the cords 810a, 810b may be a metal cables or wires.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A safety barrier board of an electrically insulating material, the safety barrier board having a plurality of edges and including a plurality of attachment holes along a first one of the plurality of edges, the plurality of attachment holes configured to receive a plurality of fastening devices configured to attach the safety barrier board to an electrical substation, and the safety barrier board further including at least first and second cutouts proximate second and third ones of the plurality of edges, each of the first and second cutout configured to provide a gripping handle of the safety barrier board.

2. The safety barrier board of claim 1 further comprising the plurality of fastening devices, each of the fastening devices including:
   a coupling link configured to be inserted in one of the plurality of holes;
   an attachment device configured to be coupled to the electrical substation; and
   a fastening component having a first end configured to be attached to the coupling link and a second end configured to be attached to the attachment device, the variable length fastening component configured to provide variable length between the first and second ends.

3. The safety barrier board of claim 2, wherein the coupling link comprises a carabiner.

4. The safety barrier board of claim 3, wherein the attachment devices comprises an attachment hook.

5. The safety barrier board of claim 4, wherein the attachment hook comprises a positioning hole configured to receive a positioning tool.

6. The safety barrier board of claim 5, wherein the variable length fastening component comprises a chain.

7. The safety barrier board of claim 6, where each of the coupling link, attachment hook and chain is plastic.

8. The safety barrier board of claim 1, wherein the safety barrier board is rectangular shaped.

9. The safety barrier board of claim 1 further comprising the plurality of fastening devices, wherein the plurality of fastening devices include a plurality of pairs of fixed length fastening devices, each pair fixed length of fastening devices having a length that is different than lengths of the other pairs of fixed length fastening devices.

10. A safety barrier board of an electrically insulating material, the safety barrier board having a surface and including a fastening device attached to the surface and configured to attach the safety barrier board to a switch blade of a sidebreak switch, wherein the fastening device includes a pair of inverted-J-hooks attached to the surface of the safety barrier board and configured to be attached to the switch blade of the side-break switch.

11. The safety barrier board of claim 10, wherein each of the inverted-J-hooks includes holes and a locking configured to be inserted in the holes to secure the inverted-J-hook to the switch blade, and further includes a cord attaching the locking pin to the inverted-J-hook.

12. The safety barrier board of claim 11, wherein the safety barrier board is rectangular shaped and has four edges, and further comprises a plurality of cutouts, each cutout positioned proximate one of the edges and configured to provide a gripping handle of the safety barrier board.

13. The safety barrier board of claim 12, wherein each of the inverted-J-hooks is an electrically insulating material.

14. A method of installing a safety barrier board in an electrical substation, the method comprising:
selecting a length for each of a plurality of fastening devices configured to attached to a safety barrier board, the safety barrier board being an electrically insulating material and having a plurality of edges and a plurality of holes along a first one of the plurality of edges, the plurality of holes configured to receive the plurality of fastening devices and the safety barrier board including at least first and second cutouts proximate second and third ones of the plurality of edges, each of the first and second cutout configured to provide a gripping handle of the safety barrier board; and
attaching the fastening devices to an electrical substation to position the safety barrier board in desired position within the electrical substation.

15. The method of claim 14 further comprising attaching the plurality of fastening devices to the selected ones of the plurality of holes in the safety barrier board.

16. The method of claim 15 further comprising:
attaching a positioning tool to at least one of the plurality of fastening devices; and
using the positioning tool in attaching the fastening devices to the electrical substation.

17. The method of claim 14, wherein selecting the length for each of the plurality of fastening devices comprising selecting a pair of fastening devices from among a plurality of pairs of fixed length fastening devices, each pair of fixed length fastening devices having a different length.

18. The method of claim 14, wherein selecting the length for each of the plurality of fastening devices comprises setting the length of a variable length fastening component of each of the plurality of fastening devices.

* * * * *